United States Patent
Weston et al.

(10) Patent No.: US 12,397,603 B1
(45) Date of Patent: Aug. 26, 2025

(54) ILLUMINATING COATING FOR AN ELEMENT OF A SUSPENSION ASSEMBLY

(71) Applicant: Ford Global Technologies, LLC, Dearborn, MI (US)

(72) Inventors: Keith Weston, Canton, MI (US); David D. Friske, Wolverine Lake, MI (US); Michael Joseph Niksa, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/828,119

(22) Filed: Sep. 9, 2024

(51) Int. Cl.
| | |
|---|---|
| *B60G 17/019* | (2006.01) |
| *B60G 15/06* | (2006.01) |
| *B60G 17/015* | (2006.01) |
| *B60G 17/02* | (2006.01) |

(52) U.S. Cl.
CPC ......... *B60G 17/019* (2013.01); *B60G 15/062* (2013.01); *B60G 17/0152* (2013.01); *B60G 17/021* (2013.01); *B60G 2202/12* (2013.01); *B60G 2401/10* (2013.01); *B60G 2401/12* (2013.01)

(58) Field of Classification Search
CPC ............... B60G 17/019; B60G 15/062; B60G 17/0152; B60G 17/021; B60G 2202/12; B60G 2401/10; B60G 2401/12; B60G 17/01941; B60G 15/061; B60G 15/067; B60G 15/07; B60G 17/0272
See application file for complete search history.

(56) References Cited

U.S. PATENT DOCUMENTS

| | | | |
|---|---|---|---|
| 9,740,244 B2 | 8/2017 | Rayeski | |
| 10,899,299 B1* | 1/2021 | Ali | B60Q 1/543 |
| 2015/0360606 A1* | 12/2015 | Thompson | B60Q 3/283 |
| | | | 362/490 |
| 2018/0312106 A1* | 11/2018 | Tatara | B60Q 1/32 |
| 2021/0268955 A1* | 9/2021 | Parker | F21V 3/00 |

FOREIGN PATENT DOCUMENTS

| | | | |
|---|---|---|---|
| CN | 218948873 U | * | 5/2023 |
| JP | 6137619 B2 | | 5/2017 |
| JP | 6307837 B2 | | 4/2018 |
| WO | 2020238373 A1 | | 12/2020 |
| WO | 2022228330 A1 | | 11/2022 |

OTHER PUBLICATIONS

Huang, CN-218948873-U, Machine Translation of Specification (Year: 2023).*

* cited by examiner

*Primary Examiner* — Paul N Dickson
*Assistant Examiner* — Matthew Joseph Ganci
(74) *Attorney, Agent, or Firm* — Burr & Forman; Lorne Forsythe (57) ABSTRACT

The suspension assembly may include a suspension element operably coupling a chassis to a wheel assembly of the vehicle, and a coating operably coupled to an exposed portion of the suspension element that is compressed or displaced responsive to a suspension event. The coating when powered may emit light to illuminate the suspension element and an area proximate to the suspension element.

20 Claims, 4 Drawing Sheets

ILLUMINATING COATING FOR AN ELEMENT OF A SUSPENSION ASSEMBLY

TECHNICAL FIELD

Example embodiments generally relate to suspension assembly components and, more particularly, relate to a coating for a suspension assembly element.

BACKGROUND

The suspension assembly is an important aspect of a vehicle to an operator. As a portion the suspension assembly is exposed, an illuminated portion of the suspension assembly may visually highlight a specific suspension element. Standard illumination via LEDs adds increased complexity to the suspension assembly. As such, an illuminated coating without LEDs that may be applied to a suspension element may be desired.

BRIEF SUMMARY OF SOME EXAMPLES

In accordance with an example embodiment, a suspension assembly of a vehicle may be provided. The suspension assembly may include a suspension element operably coupling a chassis to a wheel assembly of the vehicle, and a coating operably coupled to an exposed portion of the suspension element that is compressed or displaced responsive to a suspension event. The coating, when powered, may emit light to illuminate the suspension element and an area proximate to the suspension element.

In another example embodiment, a suspension element for operably coupling a chassis to a wheel assembly of a vehicle may be provided. The suspension element may include a first interface portion in contact with a chassis component, a second interface portion in contact with a wheel assembly component, a reaction portion disposed between the first interface portion and the second interface portion to be displaced or compressed responsive to a suspension event, an exposed portion externally visible when the suspension event occurs, and a coating operably coupled to the exposed portion of the suspension element that is displaced or compressed responsive to the suspension event. The coating, when powered, may emit light to illuminate the suspension element and an area proximate to the suspension element.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4, including

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the issues described above. In this regard, for example, some embodiments may provide a coating for a suspension element of a vehicle. As a result, the addition of the coating may provide illumination to the suspension element.

Figure 1:
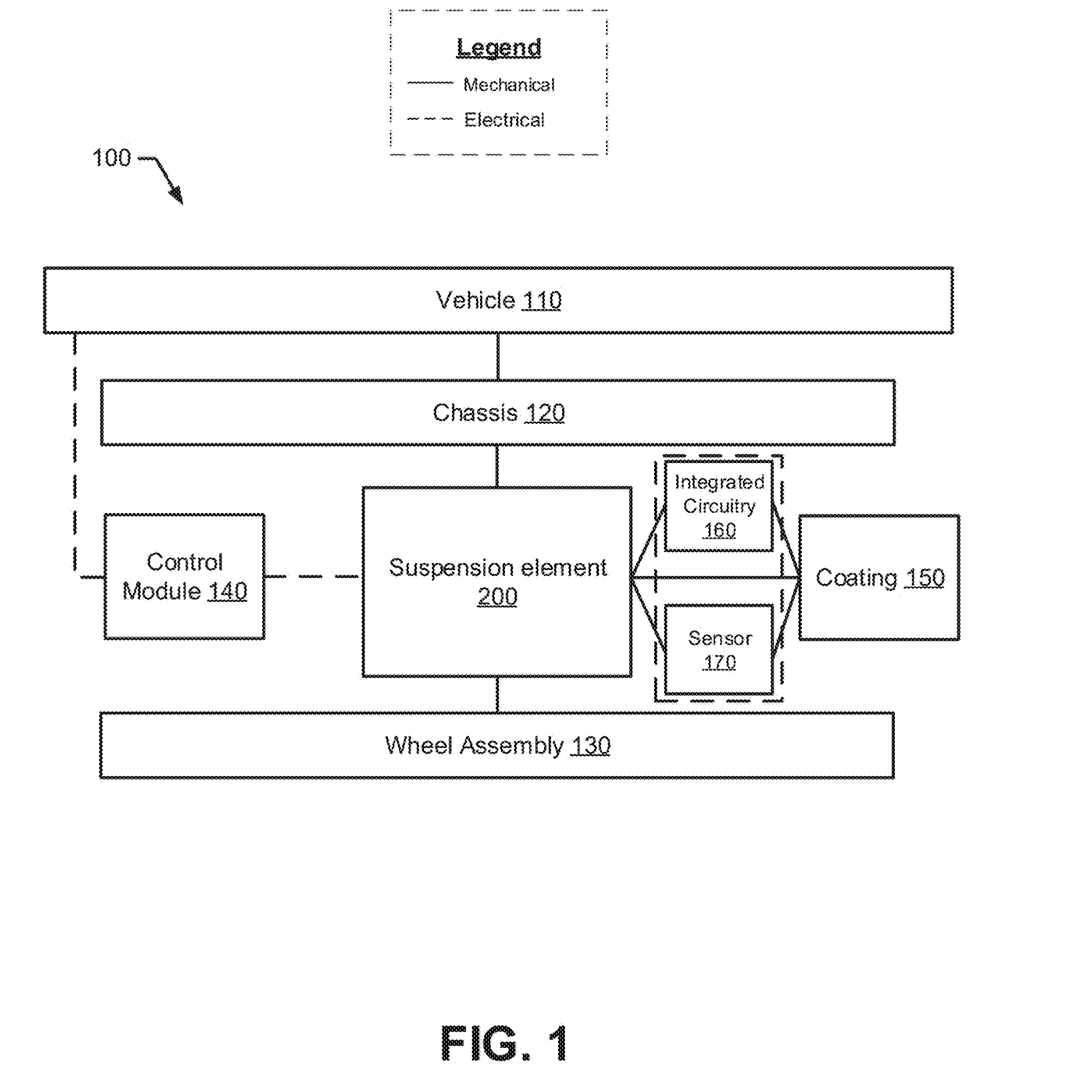
FIG. 1 depicts a block diagram of a suspension assembly for a vehicle in accordance with an example embodiment.

FIG. 1 illustrates a block diagram of a suspension assembly 100 for a vehicle 110 in accordance with an example embodiment. As seen in FIG. 1, some cases, the vehicle 110 may include a chassis 120. In an example embodiment, the chassis 120 may be a frame or body of the vehicle 110. In some cases, the chassis 120 or frame may support and/or may form the foundation structure of the vehicle 110. In an example embodiment, the chassis 120 and/or frame may be formed of one or more casted subframes, and a suspension element 200 may be operably coupled to the chassis 120 or frame to help operably couple a wheel assembly 130 to the chassis 120 or frame.

In some cases, the suspension element 200 may be a variety of different components within the suspension assembly 100 of the vehicle 110. In an example embodiment, the suspension element 200 may be a spring. For example, the suspension element 200 may be a coil spring, a pneumatic spring, a torsion spring, or any number of different types of springs (i.e. leaf spring) that may be present within the suspension assembly 100. In some cases, the coil spring and/or the pneumatic spring may be a component of a suspension damper for the suspension assembly 100. The suspension damper may function to absorb compression and rebound loading along a longitudinal axis of the suspension damper. In this regard, the suspension damper may significantly limit oscillations and vibrations of the vehicle 110 by dampening the articulation motion of the wheel assembly 130 so that the articulation of the wheel assembly 130 is not directly transferred to the chassis 120 of the vehicle 110.

In an example embodiment, the suspension damper may be a vertical damper that, in some other cases, may be referred to as a shock absorber. In some cases, the suspension damper may include a both a coil spring and a pneumatic spring. For example, a coil spring may surround a pneumatic spring to assist in vehicle damping. In an example embodiment, as the vehicle traverses uneven terrain and the wheel assembly 130 articulates towards the chassis 120, the suspension damper may compress due to a compression loading force. In some cases, the suspension damper may be a monotube shock absorber, a twin-tube shock absorber, or a bladder shock absorber depending on the type of vehicle 110 or the desired damping control. In an example embodiment, the suspension damper may be active, semi-active, or passive. In an example embodiment, the active or semi-active damper may utilize measurements from a sensor suite of the vehicle 110 to adjust the suspension damper accordingly.

In some cases, the suspension element 200 may be a torsion spring. In an example embodiment, the torsion spring may be a torsion bar and part of a torsion spring suspension assembly or torsion bar suspension assembly. In some cases, the suspension element 200 may be other elements within the suspension assembly 100, including but not limited a stabilizer bar, control arm, steering hub, suspension sleeve, suspension bellows, suspension cover or a suspension bushing. The suspension sleeve, suspension bellow, and suspension cover may be disposed over a coil spring or be an element of the suspension damper. In an example embodiment, the suspension element 200 may be multiple suspension elements. For example, there may be multiple coil springs or suspension dampers within the suspension assembly 100.

In some cases, the suspension element 200 may be operably coupled to a control module 140. In an example embodiment, the control module 140 may be a controller. In some cases, the control module 140 may include one or more control modules (i.e. sub-control modules or operably coupled to other control modules). The control module 140 may include processing circuitry that includes a processor and memory. The processing circuitry may be configured to provide electronic control of the inputs to one or more functional units of the suspension assembly 100 and to process data received at or generated by the one or more functional units of the suspension assembly 100. Thus, the processing circuitry may be configured to perform data processing, control function execution and/or other processing and management services according to an example embodiment. In some embodiments, the processing circuitry may be embodied as a chip or chip set. In other words, the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry may therefore, in some cases, be configured to implement an embodiment of the present invention on a single chip or as a single "system on a chip." As such, in some cases, a chip or chipset may constitute means for performing one or more operations for providing the functionalities described herein. In an example embodiment, other vehicle control modules may include similar processing circuitry.

The control module 140 may be operably coupled to the suspension element 200 and other vehicle components via a variety of methods. The control module 140 may utilize wired or wireless communications to communicate and receive information from vehicle components. In some cases, the control module 140 may receive information from other vehicle control modules connected to the vehicle 110 or external control modules (i.e. databases, service centers, subscription providers, etc.).

In an example embodiment, the suspension element 200 may be operably coupled to a coating 150. The coating 150 being operably coupled to the suspension element 200 may mean the coating 150 may be applied to the suspension element 200. The coating 150 may operably couple to any number of portions of the suspension element 200. In some cases, the coating 150 may operably couple to other components of the suspension assembly 100 and/or the vehicle 110. In an example embodiment, the coating 150 may be a single-layered or multi-layered. In some cases, the coating 150 may provide corrosion resistance for the suspension element 200 and/or the suspension assembly 100. The coating 150 may be a polymer-based, and the coating 150 may have elasticity that allows for movement of the suspension element 200 and/or the suspension assembly 100 without interrupting coverage of the coating 150. The coating 150 may be applied to other elements of the vehicle 110 as well, such as but not limited to a wheel hub.

In some cases, the suspension element 200 and the coating 150 may be operably coupled to integrated circuitry 160 and a sensor 170. In an example embodiment, the integrated circuitry 160 and the sensor 170 may be embedded within the coating 150. In an example embodiment, the integrated circuitry 160 may include the sensor 170. In some cases, the sensor 170 may be a sensor suite and may include multiple sensors. In an example embodiment, the sensor 170 may provide active suspension telemetry data in real-time to the control module 140 of the vehicle 110. The sensor 170 may be a strain gauge, a displacement sensor, a position sensor, a thermal sensor, a torque sensor, or any other sensor that may provide suspension data, vehicle data, or environment data to the vehicle 110. The control module 140 may utilize the active suspension telemetry data to adjust vehicle modes or the suspension assembly 100 depending on the specific data received. The active suspension telemetry data may only be a single input of data of a larger data pool that the control module 140 may utilize to make adjustments to the vehicle 110.

Figure 2:
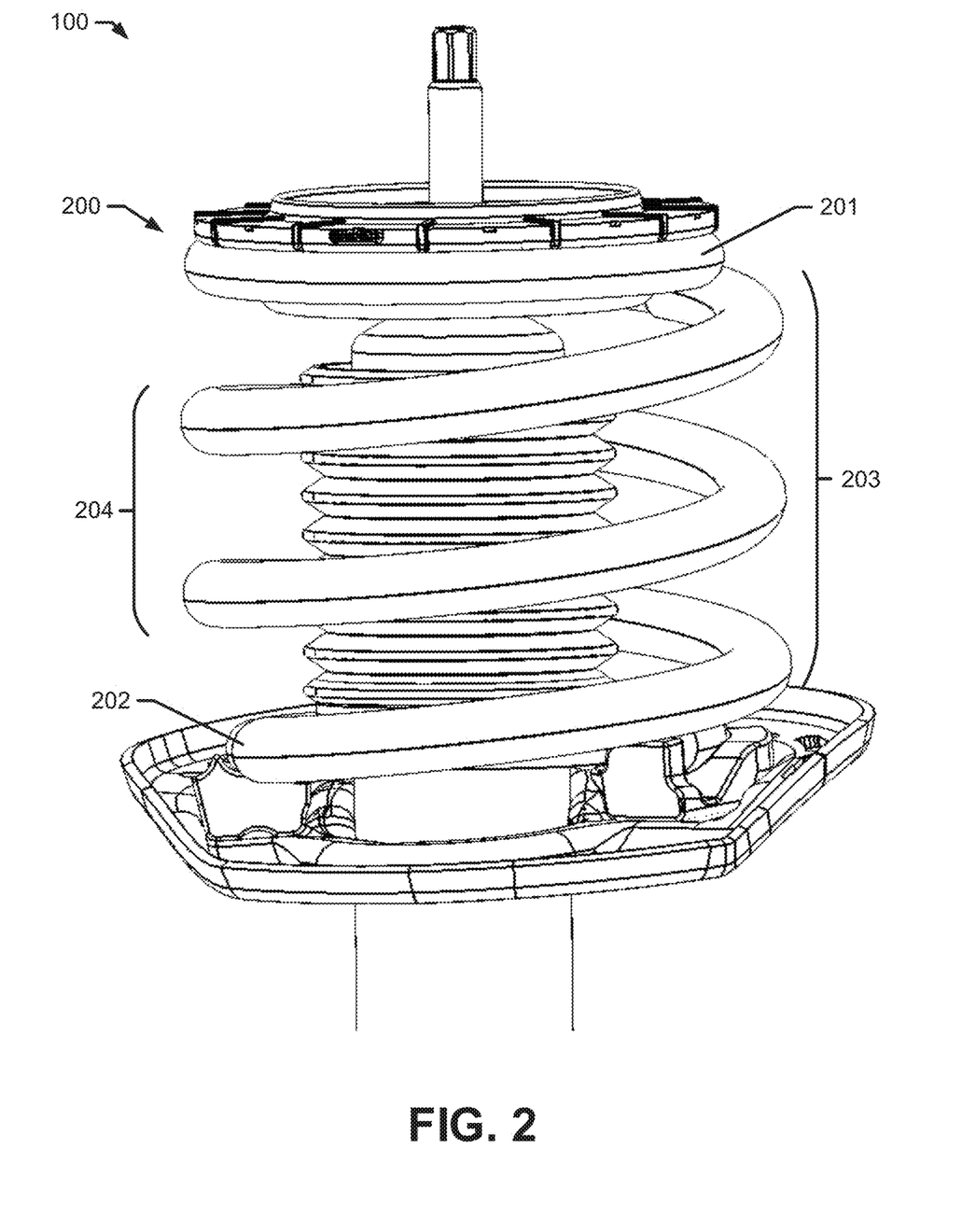
FIG. 2, illustrates a perspective view of a suspension assembly in accordance with an example embodiment.
Figure 3:
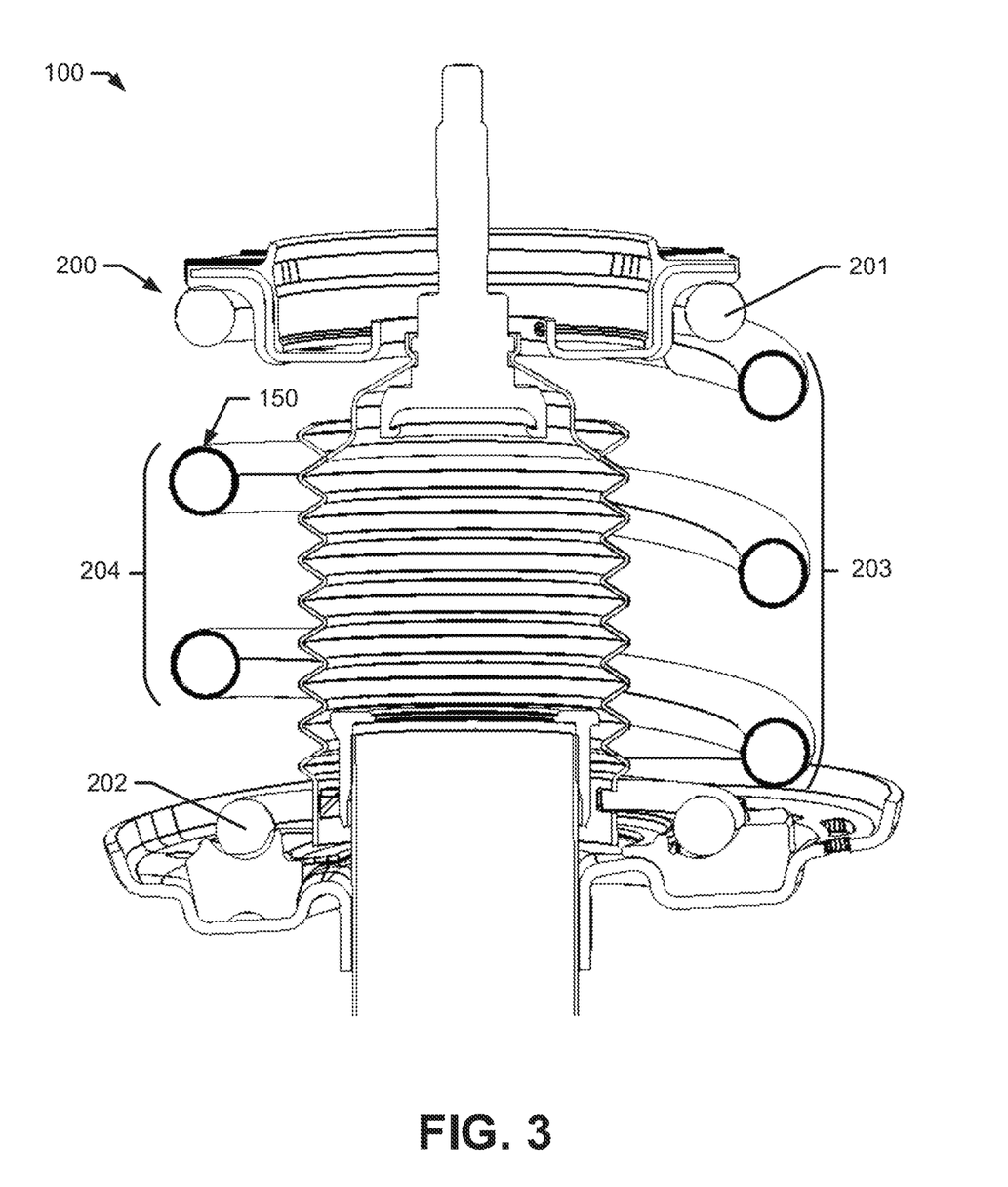
FIG. 3 depicts a cross-section of a suspension assembly in accordance with an example embodiment.

FIG. 2 illustrates a perspective view of a suspension assembly in accordance with an example embodiment. FIG. 3 depicts a cross-section of a suspension assembly in accordance with an example embodiment. FIG. 4 illustrates perspective views of a suspension element in accordance with an example embodiment. In some cases, the suspension element 200 may include a first interface portion 201 and a second interface portion 202. A first interface portion 201 may be in contact with the chassis 120 and/or may operably couple the suspension element 200 to the chassis 120. The second interface portion 202 may be in contact with the wheel assembly 130 and/or may operably couple the suspension element 200 to the wheel assembly. For example, if the suspension element 200 is a coil spring, a first distal end of the coil spring may be the first interface portion 201 to operably couple the chassis 120 and the suspension element 200, and a second distal end of the coil spring may be the second interface portion 202 to operably couple the suspension element 200 and the wheel assembly 130.

In a further example, if the suspension element 200 is a suspension bushing, an exterior surface of the suspension bushing may be the first interface portion 201, and an interior surface of the suspension bushing may be the second interface portion 202. In some cases, the first interface portion 201 may be the internal surface of the suspension bushing, and the second interface portion 202 may be the external surface of the suspension bushing. In an example embodiment, the first interface portion 201 and the second interface portion 202 may operably couple with other suspension assembly components to operably couple the suspension element 200 with the chassis 120 and the wheel assembly 130 respectively. In some cases, the other suspension assembly components may include a suspension bushing, a spring rest/stop, or any other connection/attachment mechanisms that may operably couple the suspension element 200 with the chassis 120 and the wheel assembly 130.

Figure 4A:
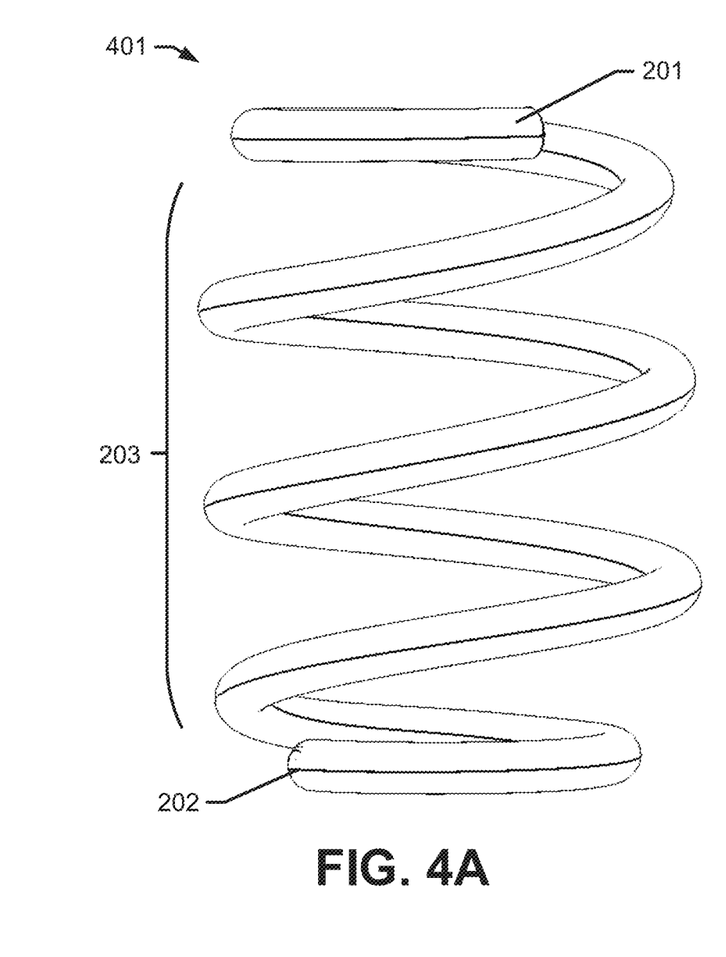
FIGS. 4A and 4B, illustrates perspective views of a suspension element in accordance with an example embodiment.
Figure 4B:
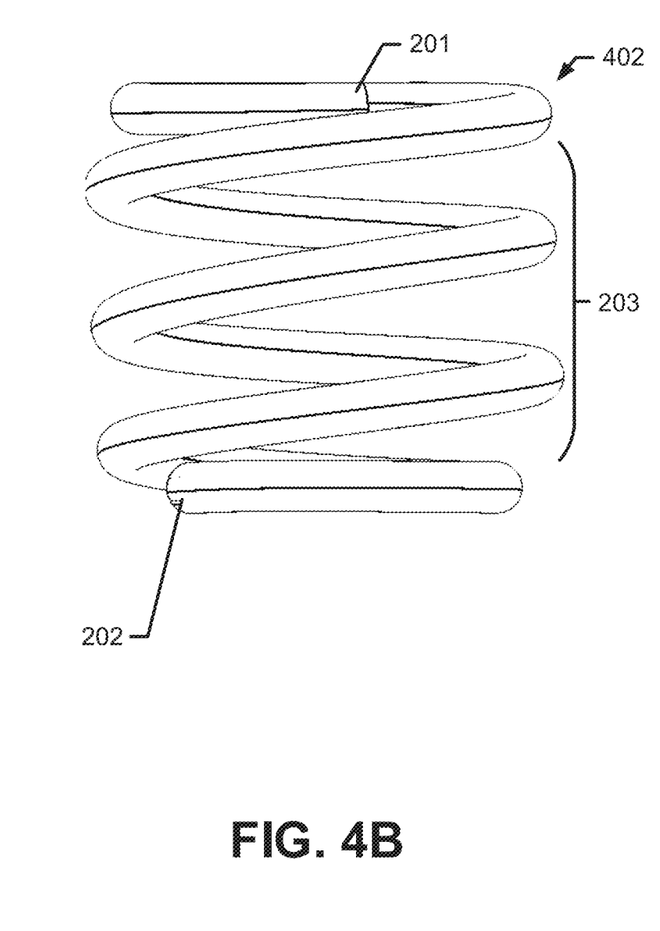

In an example embodiment, the suspension element 200 may include a reaction portion 203. The reaction portion 203 may be disposed between the first interface portion 201 and the second interface portion 202. In some cases, the reaction portion 203 may not have to be directly disposed between the first interface portion 201 and the second interface portion 202. For example, the reaction portion 203 may be disposed proximate the first interface portion 201 and the second interface portion 202. The reaction portion 203 may be displaced or compressed responsive to a suspension event. A suspension event may be any event that may cause displacement or compression with the suspension assembly 100. For example, the suspension event may be caused by the vehicle 110 experiencing a rough driving surface or while the vehicle 110 is off-roading. For example, as seen in FIG. 4, if the suspension element 200 is a spring, the suspension element 200 may an undisplaced spring 401 prior to a suspension event in FIG. 4A. Responsive to the suspension event, the undisplaced spring 401 may be compressed to the be positioned as the displaced spring 402 in FIG. 4B. The reaction portion 203 may be the primary portion of the spring changed between the undisplaced spring 401 and the displaced spring 402 responsive to the suspension event occurring. In an example embodiment, the suspension event may be caused by the vehicle 110 via the control module 140.

In some cases, the suspension element 200 may include an exposed portion 204. The exposed portion 204 of the suspension element 200 may be visible from the exterior of the vehicle 110 when the suspension event occurs. In an example embodiment, the exposed portion 204 may be a percentage of, a section of, or may overlap with the reaction portion 203 of suspension element 200. In some cases, the exposed portion 204 and/or the reaction portion 203 of the suspension element 200 may be a percentage of, a section of, or may overlap with the first interface portion 201 and the second interface portion 202 of suspension element 200.

In some cases, the coating 150 may be operably coupled to the reaction portion 203 of the suspension element 200. In an example embodiment, the coating 150 may be operably coupled to the exposed portion 204 of the suspension element 200. In some cases, the coating 150 may be operably coupled to a section of the suspension element 200 that includes the both the reaction portion 203 and the exposed portion 204. The coating 150 may be operably coupled to a variety of portions of the suspension element 200, including but not limited to the first interface portion 201, the second interface portion 202, the reaction portion 203, and the exposed portion 204.

In an example embodiment, the coating 150 may emit light. The coating 150 may emit light when powered to illuminate the suspension element 200 and/or an area proximate to the suspension element 200 (i.e. the suspension assembly 100 or other vehicle components/environment). The coating 150 may emit light based on an electroluminescent property of the coating. In some cases, a variety of different methods and materials may provide the electroluminescent property to the coating 150. For example, the electroluminescent property may be added to the coating 150 via zinc sulfide compositions with different additional metal types. For instance, depending on the metal type (i.e. copper, silver, manganese, etc.) added with the zinc sulfide compositions, the color and other properties of the electroluminescent property of the coating 150 may vary.

In an example embodiment, the coating 150 may only emit light when powered. In some cases, the coating 150 may be powered by a wired connection to one or more onboard power sources of the vehicle 110. In some cases, the one or more onboard power sources of the vehicle 110 may be a primary battery or other battery of the vehicle 110. In an example embodiment, the one or more onboard power sources may be primary power sources for other vehicle components, including but not limited to the control module 140, vehicle sensor suites, and other powered suspension assembly/vehicle components. In some cases, the one or more onboard power sources may be integrated within the suspension element 200. For example, the suspension element 200 may include its own battery or power source.

In some cases, the coating 150 may be powered via a piezoelectric element. The piezoelectric element may utilize movement or displacement of the suspension element 200 and convert the movement or displacement of the suspension element to electrical energy. In an example embodiment, the movement or displacement of the suspension element 200 may be a compression, relaxation, and/or displacement of a spring at the reaction portion 203 of the suspension element 200 and may be converted into electrical power via the piezoelectric element.

In some cases, the coating 150 may be powered via a thermoelectric element. The thermoelectric element may utilize heat created via movement or displacement of the suspension element 200 and convert the heat to electrical energy. In an example embodiment, the movement or displacement of the suspension element 200 may be a compression of a spring at the reaction portion 203 of the suspension element 200, and the heat created from the compression of the suspension element 200 may be converted into electrical power via the thermoelectric element. In some cases, the coating 150 may be powered via a radio frequency (RF) power element. The RF power element may by a wireless power transfer element that picks up low-level radio frequency waves from a source and converts the wave's energy to electrical power.

In an example embodiment, the one or more onboard power sources, the piezoelectric element, and/or the thermoelectric element may provide electrical power directly to the coating 150 to utilize/activate its electroluminescent property. In this regard, the coating 150 may emit light without the need for an explicit lighting elements or LEDs. The lack of explicit lighting elements or LEDs may allow for less complexity in the construction, assembly, or instillation of the suspension assembly 100. In some cases, the one or more onboard power sources, the piezoelectric element, and/or the thermoelectric element may be included with and/or in the integrated circuitry 160. In an example embodiment, the one or more onboard power sources, the piezoelectric element, and/or the thermoelectric element may be embedded within the coating 150.

The integrated circuitry 160 may include wires, one or more electrical connections, sensor circuitry, sensor hardware, and any other circuitry types that may provide additional functionality to the suspension element 200 and the suspension assembly 100. In some cases, the one or more electrical connections of the suspension element 200 may operably couple to other components of the vehicle 110 (i.e. the control module 140). In an example embodiment, the one or more electrical connections may be disposed at a substantially stationary portion of the suspension element 200. Substantially stationary may be considered stationary relative to other portions of the suspension element 200 or less than 10 cm of displacement of the portion from its initial position. The substantially stationary portion of the suspension element 200 may be the first interface portion 201 and/or the second interface portion 202. Positioning the one or more electrical connection at the substantially stationary portion of the suspension element 200 may ensure secure performance of the one or more electrical connections, as the limited movement at the substantially stationary portion may prevent incidental disconnection of the one or more electrical connections.

In some cases, conductive ink printing may form the integrated circuitry 160 of the suspension element 200. Conductive ink printing may use a ink jet printer to apply very precise circuits to a variety of objects, including fabrics and rigid objects. The conductive ink may be a liquid-based ink. With conductive ink printing, a computer-aided design (CAD) of circuitry or electronics may be directly incorporated during or after the primary manufacturing or assembly process of the suspension element 200 or suspension assembly 100 without losing specificity. Conductive ink printing may include conductive inks composed with conductive metal fillers and polymer resins. The conductive metal fillers may provide electrical and thermal properties. For example, the conductive metal filler may be silver, as the conductive ink needs to be easily liquefied at relatively low temperatures (i.e. 500° F. or less), while maintaining its conductivity through the printing process and application. In some cases, the temperature threshold may be higher (i.e. 2000° F. or less) depending on the application. The polymer resins may provide mechanical strength and flexibility in application of the conductive ink printing. For example, silver nitrate may be a commonly used ink for conductive ink printing. Forming the integrated circuitry 160 via conductive ink printing may allow for increased flexibility of the suspension element 200 and suspension assembly 100. Additionally, the conductive ink printing may provide increased ease of integration of the integrated circuitry 160. Conductive ink printing may also be conductive ink painting.

In some cases, the sensor 170 may be embedded within the coating 150 via conductive ink printing. For example, if the sensor 170 is a strain gauge, specific strain gauge patterns may be integrated within the coating 150. Conductive ink printing may ease the integration of specific and/or complex strain gauge patterns within the suspension element 200. The locations of the sensor 170 within the suspension element 200 may vary, as well. For instance, the sensor 170 may be disposed at a location of the suspension element 200 that may experience the most displacement. For example, if the suspension element 200 is a coil spring of a vertical damper, the sensor 170 may be disposed at the distal end of the coil spring closest to the wheel assembly 130. In some cases, the location may be the reaction portion 203 of the suspension element 200 to provide real-time data of the compression and/or displacement of the suspension element 200. In an example embodiment, the sensor 170 may be disposed at a location of the suspension element 200 that provides specific data of the suspension assembly 100. For example, in some cases if the suspension element 200 is a coil spring for a vertical damper, the sensor 170 may provide spring displacement data for end stop control of the suspension element 200. In an example embodiment, the sensor 170 may be disposed at any portion of the suspension element 200, including the first interface portion 201, the second interface portion 202, the reaction portion 203, and/or the exposed portion 204.

In some cases, the sensor 170 may detect the presence of the suspension event and/or be used to classify the type of suspension event. In an example embodiment, the suspension event may be classified via the amount of displacement or compression of the suspension element 200. In some cases, responsive to the suspension event, an intensity of the light emitted from the suspension element 200 may vary. For example, if a suspension event is not occurring, the suspension element 200 may not emit light. However, if a suspension event is occurring, responsive to the suspension event, the suspension element 200 may emit light.

In some cases, the intensity of light emitted from the suspension element 200 may vary proportionally with the suspension event. For example, if the suspension element 200 is a spring and the suspension event is the compression of the spring, the intensity of the light emitted may increase as the compression of the spring increases. In the same regard, the intensity of the light emitted may decrease as compression of the spring decreases. In an example embodiment, the intensity of light emitted from the suspension element 200 may be inversely proportional with the suspension event.

In some cases, the intensity of the light emitted from the suspension element 200 may vary based upon other events and/or instructions other than suspension events. In an example embodiment, the intensity of the light emitted from the suspension element 200 may vary based on the time of day or the amount of sunlight/light around the vehicle 110. In some cases, the intensity of the light emitted from the suspension element 200 may vary based on inputs from the control module 140. The inputs from the control module 140 may be from an operator of the vehicle or automatic based on data from a sensor 170 of the vehicle 110.

In an example embodiment, if the suspension element 200 is a spring, the coating 150 may adjust a multi-rate spring characteristic of the spring. In some cases, the multi-rate spring characteristic may be a change in spring rate as the spring is displaced. Spring rate may be a measurement of the amount of force needed to compress a spring a certain distance. For example, as seen in FIG. 4, the suspension element 200 may be a spring. The undisplaced spring 401, as seen in FIG. 4A, may be the suspension element 200 prior to a suspension event. The undisplaced spring 401 may have a first spring rate. Responsive to a suspension event, the undisplaced spring 401 may be displaced to the state represented by the displaced spring 402, as seen in FIG. 4B. The displaced spring 402 may have a second spring rate. In some cases, the first spring rate may be greater than the second spring rate (i.e. spring rate decreases as the spring is displaced/compressed). In an example embodiment, the difference between the first spring rate and the second spring rate may be proportional to the suspension event (i.e. the amount of displacement/compression of the suspension element 200).

In some cases, the thickness of the coating 150 may adjust the multi-rate spring characteristic. The thickness of the coating 150 may vary based on the desired characteristic of the spring (i.e. first spring rate, second spring rate, etc.). In an example embodiment, the thickness of the coating 150 may vary throughout the suspension element 200. For example, the thickness of the coating 150 may be increased at the reaction portion 203 of the suspension element 200 compared to the first interface portion 201 and the second interface portion 202.

In some cases, the light emitted from the suspension element 200 may enhance specific images, logos, or text on the suspension element 200. For example, a company logo or vehicle model may be illuminated via the light emitted. In an example embodiment, the entirety or portions of the suspension element 200 and/or the suspension assembly 100 may be made via additive manufacturing.

A suspension assembly of a vehicle may be therefore provided. The suspension assembly may include a suspension element operably coupling a chassis to a wheel assembly of the vehicle, and a coating operably coupled to an exposed portion of the suspension element that is compressed or displaced responsive to a suspension event. The coating when powered may emit light to illuminate the suspension element and an area proximate to the suspension element.

The suspension assembly of a vehicle of some embodiments may include additional features, modifications, augmentations and/or the like to achieve further objectives or enhance performance of the suspension system. The additional features, modifications, augmentations and/or the like may be added in any combination with each other. Below is a list of various additional features, modifications, and augmentations that can each be added individually or in any combination with each other. For example, the suspension element may be a coil spring, a leaf spring, a pneumatic spring, a stabilizer bar, a torsion spring, control arm, steering hub, suspension sleeve, suspension bellows, suspension cover, or a suspension bushing. In some cases, the light may be emitted based on an electroluminescent property of the coating. In an example embodiment, the coating may be powered by a wired connection to one or more onboard power sources of the vehicle. In some cases, the coating may be powered via a piezoelectric element. In an example embodiment, the coating may be powered via a radio frequency (RF) power element. In some cases, the suspension element may include integrated circuitry embedded within the coating. In an example embodiment, the integrated circuitry may include one or more electrical connections to other components of the vehicle, and the one or more electrical connections may be disposed at a substantially stationary portion of the suspension element. In some cases, the integrated circuitry may be formed via conductive ink painting. In an example embodiment, the integrated circuitry may include a sensor, and the sensor may provide active suspension telemetry data in real-time to a control module of the vehicle. In some cases, the sensor may be a strain gauge. In an example embodiment, an intensity of the light may vary responsive to the suspension event. In some cases, the intensity of the light may vary proportionally with the suspension event. In an example embodiment, the suspension event may be an amount of displacement or compression of the suspension element. In some cases, the suspension element may be a spring, the coating may adjust a multi-rate spring characteristic of the spring, and the multi-rate spring characteristic may be a change in spring rate as the spring is displaced. In an example embodiment, a thickness of the coating may adjust the multi-rate spring characteristic. In some cases, the coating may be an elastic coating. In an example embodiment, the coating may provide corrosion resistance for the suspension element. In some cases, the reaction portion and the exposed portion may at least partially overlap.

A suspension element for operably coupling a chassis to a wheel assembly of a vehicle of an example embodiment may be provided. The suspension element may include a first interface portion in contact with a chassis component, a second interface portion in contact with a wheel assembly component, a reaction portion disposed between the first interface portion and the second interface portion to be displaced or compressed responsive to a suspension event, an exposed portion externally visible when the suspension event occurs, and a coating operably coupled to the exposed portion of the suspension element that is displaced or compressed responsive to the suspension event. The coating when powered may emit light to illuminate the suspension element and an area proximate to the suspension element.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to difficulties are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A suspension assembly of a vehicle, wherein the suspension assembly comprises:
    a suspension element operably coupling a chassis to a wheel assembly of the vehicle; and
    a coating operably coupled to an exposed portion of the suspension element that is compressed or displaced responsive to a suspension event,
    wherein the coating when powered emits light to illuminate the suspension element and an area proximate to the suspension element.

2. The suspension assembly of claim 1, wherein the suspension element is a coil spring, a leaf spring, a pneumatic spring, a stabilizer bar, a torsion spring, control arm, steering hub, suspension sleeve, suspension bellows, suspension cover, or a suspension bushing.

3. The suspension assembly of claim 1, wherein the light is emitted based on an electroluminescent property of the coating.

4. The suspension assembly of claim 1, wherein the coating is powered by a wired connection to one or more onboard power sources of the vehicle.

5. The suspension assembly of claim 1, wherein the coating is powered via a piezoelectric element.

6. The suspension assembly of claim 1, wherein the coating is powered via a radio frequency (RF) power element.

7. The suspension assembly of claim 1, wherein the suspension element further comprises integrated circuitry embedded within the coating.

8. The suspension assembly of claim 7, wherein the integrated circuitry includes one or more electrical connections to other components of the vehicle, and
    wherein the one or more electrical connections are disposed at a substantially stationary portion of the suspension element.

9. The suspension assembly of claim 7, wherein the integrated circuitry is formed via conductive ink printing.

10. The suspension assembly of claim 7, wherein the integrated circuitry further comprises a sensor,
   wherein the sensor provides active suspension telemetry data in real-time to a control module of the vehicle.

11. The suspension assembly of claim 10, wherein the sensor is a strain gauge.

12. The suspension assembly of claim 1, wherein an intensity of the light varies responsive to the suspension event.

13. The suspension assembly of claim 12, wherein the intensity of the light varies proportionally with the suspension event.

14. The suspension assembly of claim 13, wherein the suspension event is an amount of displacement or compression of the suspension element.

15. The suspension assembly of claim 1, wherein the suspension element is a spring,
   wherein the coating adjusts a multi-rate spring characteristic of the spring, and
   wherein the multi-rate spring characteristic is a change in spring rate as the spring is displaced.

16. The suspension assembly of claim 15, wherein a thickness of the coating adjusts the multi-rate spring characteristic.

17. The suspension assembly of claim 1, wherein the coating is an elastic coating.

18. The suspension assembly of claim 1, wherein the coating provides corrosion resistance for the suspension element.

19. A suspension element for operably coupling a chassis to a wheel assembly of a vehicle, the suspension element comprising:
   a first interface portion in contact with a chassis component;
   a second interface portion in contact with a wheel assembly component;
   a reaction portion disposed between the first interface portion and the second interface portion to be displaced or compressed responsive to a suspension event;
   an exposed portion externally visible when the suspension event occurs; and
   a coating operably coupled to the exposed portion of the suspension element that is displaced or compressed responsive to the suspension event,
   wherein the coating when powered emits light to illuminate the suspension element and an area proximate to the suspension element.

20. The suspension element of claim 19, wherein the reaction portion and the exposed portion at least partially overlap.

* * * * *